United States Patent
Roberts

(10) Patent No.: US 10,152,244 B2
(45) Date of Patent: Dec. 11, 2018

(54) PROGRAMMABLE MEMORY COMMAND SEQUENCER

(71) Applicant: Advanced Micro Devices, Inc., Sunnyvale, CA (US)

(72) Inventor: David A. Roberts, Santa Cruz, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 111 days.

(21) Appl. No.: 14/840,368

(22) Filed: Aug. 31, 2015

(65) Prior Publication Data

US 2017/0060450 A1    Mar. 2, 2017

(51) Int. Cl.
*G06F 3/06*   (2006.01)
*G11C 29/52*  (2006.01)
*G06F 11/10*  (2006.01)

(52) U.S. Cl.
CPC .......... *G06F 3/0619* (2013.01); *G06F 3/064* (2013.01); *G06F 3/0659* (2013.01); *G06F 3/0679* (2013.01); *G06F 11/1068* (2013.01)

(58) Field of Classification Search
CPC ...... G06F 3/0619; G06F 3/064; G06F 3/0659; G06F 11/1068; G06F 3/0679; G11C 29/52
See application file for complete search history.

(56) References Cited

U.S. PATENT DOCUMENTS

| | | | | |
|---|---|---|---|---|
| 9,432,298 B1* | 8/2016 | Smith | ................. | H04L 49/9057 |
| 2002/0032839 A1* | 3/2002 | Yamamoto | ........ | G06F 17/30902 |
| | | | | 711/118 |
| 2008/0046666 A1* | 2/2008 | Termaine | ............ | G06F 12/0607 |
| | | | | 711/154 |
| 2008/0270741 A1* | 10/2008 | Tremaine | ............ | G06F 12/0215 |
| | | | | 711/206 |
| 2011/0213945 A1* | 9/2011 | Post | ...................... | G06F 3/0644 |
| | | | | 711/173 |
| 2012/0173840 A1* | 7/2012 | Patel | ................... | G06F 13/4022 |
| | | | | 711/202 |

(Continued)

OTHER PUBLICATIONS

Bojnordi et al., "PARDIS: A Programmable Memory Controller for the DDRx Interfacing Standards", ISCA '12 Proceedings of the 39th Annual International Symposium on Computer Architecture, Jun. 9-13, 2012, 12 pages, IEEE Computer Society, Washington D.C., USA.

*Primary Examiner* — Kyle Vallecillo
(74) *Attorney, Agent, or Firm* — Meyertons Hood Kivlin Kowert and Goetzel PC; Rory D. Rankin

(57) ABSTRACT

Systems, apparatuses, and methods for utilizing a programmable memory command sequencer to generate multiple commands from a single memory request. A sequencer receives requests from a host processor and utilizes any of a plurality of programmable routines in response to determining that a given request meets specific criteria. A given programmable routine generates a plurality of memory commands which are then conveyed to a local memory controller and/or one or more remote memory controllers. The host processor programs the sequencer at boot time and updates the sequencer at runtime in response to changing application behavior. In various embodiments, the sequencer generates a variety of error correction routines in response to different requests received from the host processor.

20 Claims, 8 Drawing Sheets

(56) References Cited

U.S. PATENT DOCUMENTS

| | | | |
|---|---|---|---|
| 2012/0216012 A1* | 8/2012 | Vorbach | G06F 8/443 712/11 |
| 2012/0246449 A1* | 9/2012 | Assarpour | G06F 9/30018 712/216 |
| 2013/0151914 A1* | 6/2013 | Cadigan | G06F 11/1068 714/723 |
| 2015/0249535 A1* | 9/2015 | Mukhopadhyay | H04L 9/0618 380/28 |
| 2016/0140363 A1* | 5/2016 | Chiricescu | G06F 21/64 726/1 |

* cited by examiner

PROGRAMMABLE MEMORY COMMAND SEQUENCER

BACKGROUND

Technical Field

Embodiments described herein relate to data processing devices and more particularly, to implementing flexible memory command sequencers.

Description of the Related Art

Computer systems are incorporating more complex memory devices, as well as large numbers and diverse types of memory devices, to cope with ever increasing data storage and performance requirements. One type of computer system may include a 3D-stacked memory consisting of stacked memory dies, while other types of computer systems using other types of memory devices are also contemplated. Various types of memory devices may be utilized in these computer systems, including random-access memory (RAM), static RAM (SRAM), dynamic RAM (DRAM), high-speed CMOS, high-density DRAM, eDRAM, 3D stacked memory (e.g., stacked DRAM), interposer-based integrated memory, multi-chip modules (MCM), off-chip DRAM on a motherboard, non-volatile RAM (NVRAM), magneto-optical storage medium, read only memory (ROM), synchronous DRAM (SDRAM), double data rate SDRAM (DDR SDRAM), phase-change memory, spin-transfer torque magnetic RAM, memristor, extended data output (EDO) RAM, Rambus RAM, Rambus DRAM, erasable programmable memory (EEPROM), solid-state memory, hard disk drive, optical storage mediums, etc. Often, these memories utilize fixed memory request processing routines that are too rigid for diverse applications. Processing memory requests in a fixed manner can result in unnecessary delay in the resolution of the memory requests and can inefficiently use system resources.

Accordingly, systems and methods supporting more flexible approaches to processing memory requests are desired.

SUMMARY

Systems, apparatuses, and methods for implementing a programmable memory command sequencer are contemplated.

In one embodiment, a system may include one or more processors coupled to one or more memory devices. In various embodiments, the system may include a programmable command sequencer (PCS) for interfacing the processor(s) to the memory device(s). In one embodiment, the operating system (OS) executing on the processor(s) may pre-load the PCS instruction memory with trigger conditions and action routines for fast, flexible memory system command scheduling, hidden from the user.

In one embodiment, the PCS may include a processor or microcontroller to execute customized command sequences in response to incoming requests, providing more flexibility to handle the requests of various applications. The PCS may be configured to generate a sequence of memory commands in response to receiving an individual memory request from a host processor. For example, in one embodiment, the PCS may be configured to generate sequences of memory commands for supporting complex error correction schemes for individual memory requests. In one embodiment, the error correction functions implemented by the PCS may be independent of the operating system (OS) and memory controller.

The PCS may utilize a variety of memory command sequencing routines depending on the operating conditions and application executing on the system. In one embodiment, the system may execute an application with high security requirements, and the processor may notify the memory command sequencer to utilize a scrambling function so that data blocks end up in random locations throughout the memory. In another embodiment, the memory command sequencer may utilize different error correction functions for different applications executing on the system. For example, the memory command sequencer may utilize a first error correction scheme for memory requests of a first application and the memory command sequencer may utilize a second error correction scheme for memory requests originating from a second application. These error correction schemes may be implemented independently, and in addition to, any error correction schemes utilized by the memory controller.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Figure 1:
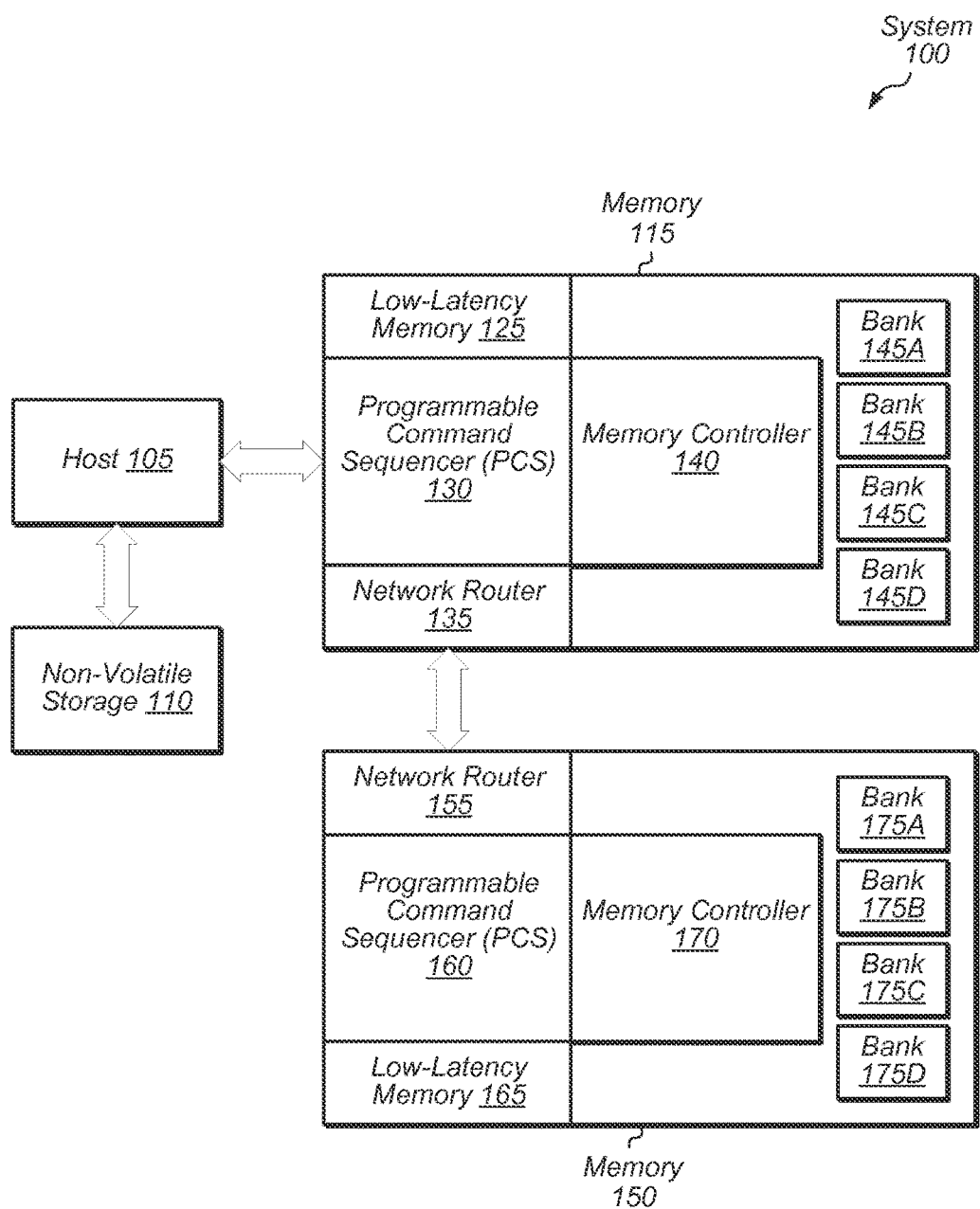
FIG. 1 is a block diagram of one embodiment of a computing system.

Referring now to FIG. 1, a block diagram illustrating one embodiment of a computing system 100 is shown. System 100 includes host 105, non-volatile storage 110, memory 115, and memory 150. Host 105 may be any type of processor with any number of cores, depending on the embodiment. In one embodiment, host 105 may execute the main control software of the system 100, such as an operating system. Generally, software executed by host 105 during use may control the other components of system 100 to realize the desired functionality of system 100. Host 105 may also execute other software, such as application programs. The application programs may provide user functionality, and may rely on the operating system for lower level device control. Non-volatile storage 110 may include any number and type of storage devices (e.g., solid-state drive, hard-disk drive, NVRAM). Memories 115 and 150 are representative of any number and type of memory devices. Memory 115 may include low-latency memory 125 and banks 145A-D, which are representative of any number of banks. Similarly, memory 150 may include low-latency memory 165 and banks 175A-D. It is noted that host 105 may be coupled to additional memories in other embodiments. It is also noted that system 100 may include other components (e.g., GPU, I/O devices, display device) not shown in FIG. 1 to avoid cluttering the figure.

Host 105 may be configured to generate and send memory requests targeting memory 115 to programmable command sequencer (PCS) 130. It is noted that PCS 130 may also be referred to as a memory command sequencer or a programmable memory command sequencer. Each memory request generated by host 105 may specify a logical address, size, priority, and one or more other attributes, depending on the embodiment. PCS 130 may be configured to receive memory requests from host 105 and generate corresponding memory commands targeting memory 115, memory 150, or another memory (not shown). In various embodiments, PCS 130 may be configured to generate a sequence of memory commands and convey the sequence of memory commands to local memory controller 140 and/or remote memory controller 170 in response to receiving a memory request from host 105. PCS 130 may map a logical address of a received memory request into multiple logical and/or physical addresses. The mapping(s) may determine which memories are targeted by a given memory command. Memory commands targeting memory 150 may be routed through network router 135 and network router 155 to memory 150 via memory controller 170. Memory commands targeting memory 115 may be sent from PCS 130 to memory controller 140. Memory controller 140 may be configured to translate the received memory commands into low-level commands in accordance with the timing and resource constraints of memory 115. Generally speaking, PCS 130 may operate at a higher level than memory controllers 140 and 170. In other words, PCS 130 may handle distributed parity or distributed blocks, while memory controllers 140 and 170 may deal with physical blocks. It is noted that the memory commands generated by PCS 130 may also be referred to as memory requests to differentiate them from the low-level commands generated by memory controllers 140 and 170.

In one embodiment, PCS 130 may be configured to implement error correction functions to protect the data of host 105 by storing redundant data in memories 115 and/or 150. The redundant data may include parity bits and error correction code (ECC) bits. PCS 130 may be configured to dynamically adjust the type of error correction function utilized based on different types of memory requests, different types of applications, explicit commands from host 105, changing system conditions, and/or other factors. Additionally, in some embodiments, PCS 130 may be configured to perform a scrubbing operation in response to detecting a first condition. The scrubbing operation is a background task that is periodically executed to identify and correct for errors in data stored on a memory device. Periodically running scrubbing operations reduces the likelihood that correctable errors will accumulate, thus reducing the risk of uncorrectable errors. The first condition for triggering the scrubbing operation may be detecting system downtime, low system utilization of the memory, a processor entering sleep state, a number of errors exceeding a threshold, an error rate exceeding a threshold, and/or another condition, depending on the embodiment.

Computing system 100 may correspond to any of various types of systems or computing devices, including, but not limited to, a personal computer system, desktop computer, laptop or notebook computer, supercomputer, tablet, phone, smartphone, mainframe computer system, handheld computer, workstation, network computer, a consumer device, server, file server, application server, storage server, storage device, a peripheral device such as a switch, modem, router, etc., or in general any type of computing device.

Figure 2:
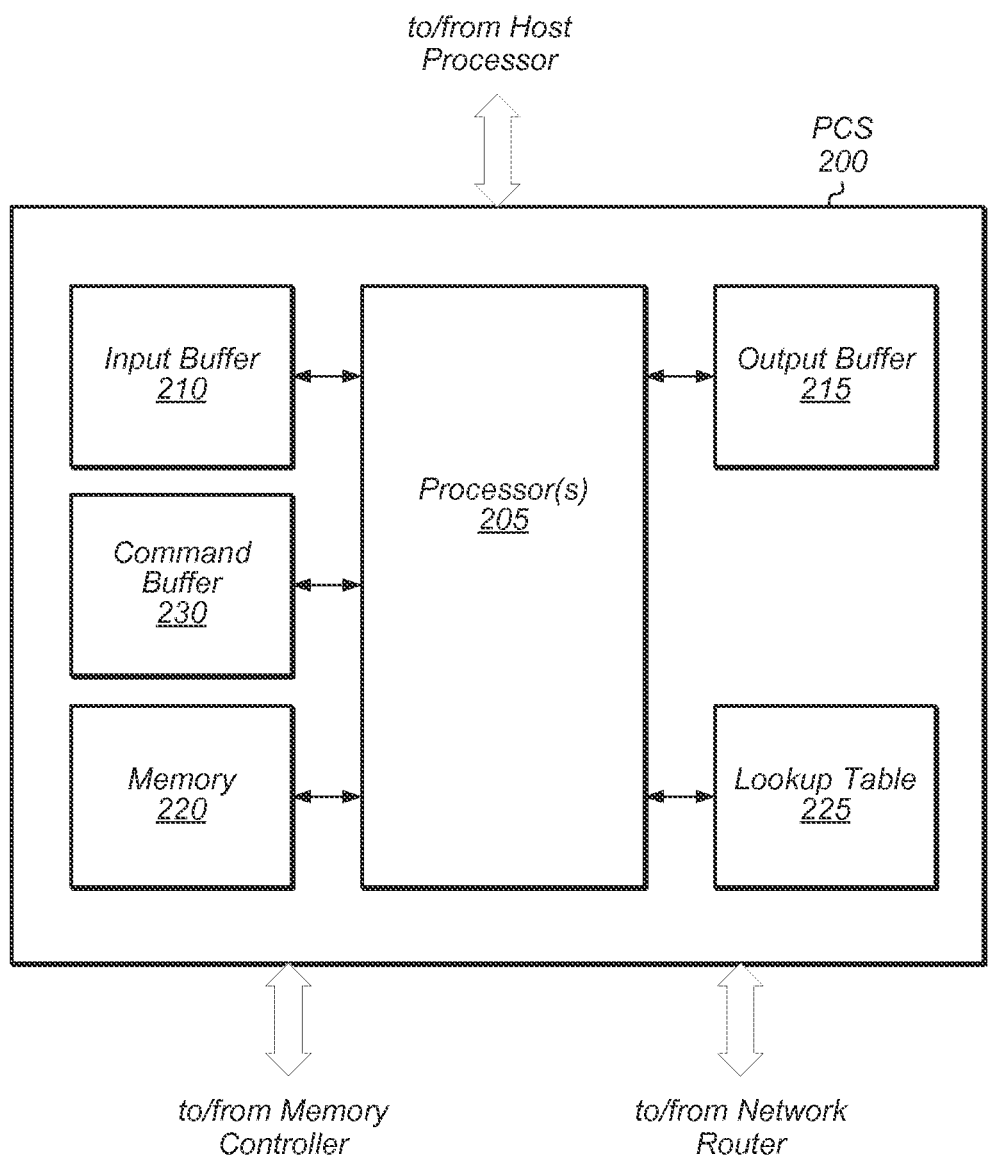
FIG. 2 is a block diagram of one embodiment of a programmable command sequencer (PCS).

Turning now to FIG. 2, a block diagram of one embodiment of a programmable command sequencer (PCS) 200 is shown. PCS 200 may include processor(s) 205, which is representative of any number and type of processors. In one embodiment, processor(s) 205 may be one or more general purpose processors or microcontrollers. In another embodiment, processor(s) 205 may be implemented with dedicated logic such as an application-specific integrated circuit (ASIC). In a further embodiment, processor(s) 205 may be implemented with programmable logic (e.g., field programmable gate array (FPGA)). In a still further embodiment, processor(s) 205 may include any combination of the above components and/or one or more other components. The block diagram of PCS 200 is intended to represent one possible implementation of a PCS in accordance with one or more embodiments. The logic of PCS 200 may be arranged differently and/or may include other components in other embodiments.

PCS 200 may also include input buffer 210 for storing memory requests received from the host processor (not shown) (e.g., host 105 of FIG. 1). PCS 200 may periodically scan input buffer 210 for new memory requests. When a new memory request is received, PCS 200 may decode the logical address of the request and perform a lookup of lookup table 225 using the decoded address. If the incoming memory request matches one or more criteria, then the lookup of lookup table 225 will result in a hit. If the lookup is a hit, then PCS 200 may read the results of the lookup to determine which code functions to execute for the incoming memory request. The routine referenced by the hit entry of lookup table 225 may generate a sequence of memory commands, and the routine may use the address of the memory request to calculate new addresses for these memory commands. The memory commands may be buffered in command buffer 230 prior to being sent to their destination. The memory commands may target local memory and/or remote memory and may be conveyed to a local memory controller and/or remote memory controllers. In one embodiment, lookup table 225 may be a code pointer lookup table. In another embodiment, lookup table 225 may be a hardware content-addressable memory (CAM). In other embodiments, other structures may be utilized to implement lookup table 225.

In one embodiment, the code for generating the memory command sequences may be loaded into memory 220 at boot time and may be changed at runtime from the host. When triggered, the sequencer routines may read the command type and address from input buffer 210. PCS 200 may assign a tag to associate the host memory request with any generated sub-commands. Then, PCS 200 may issue a sequence of tagged sub-commands into command buffer 230 or to the destination memory controller queue. For any responses, PCS 200 may buffer the response data in output buffer 215 prior to sending the responses back to the requesting device (e.g., the host, another networked memory controller). Alternatively, rather than buffering tagged responses in output buffer 215, PCS 200 may immediately forward the tagged responses to the requesting device. PCS 200 may also generate a signal to the requestor to indicate if an error was detected when reading data corresponding to a read memory request.

In one embodiment, PCS 200 may be configured to implement a triple-modular redundancy (TMR) scheme across three storage devices for a given address range. Accordingly, PCS 200 may receive and store an incoming host request in input buffer 210. The address of the incoming host request may be decoded and a PCS routine pointer may be looked up in lookup table 225. Then, a unique tag may be assigned to the request. Then, the routine may include calculating three device addresses based on the host request. A first replicated read or write command may be sent to a local memory controller, a second replicated read or write command may be sent to a first remote memory controller, and a third replicated read or write command may be sent to a second remote memory controller. PCS 200 may collect any responses, using the tag match to identify sub-commands, and then PCS 200 may return the results to the original requestor. In other embodiments, other redundancy schemes may be utilized targeting other numbers of storage devices.

In another embodiment, PCS 200 may execute routines for performing data evacuation from the locally attached memory. For example, PCS 200 may receive an evacuation command from the host processor. In response to receiving the evacuation command, PCS 200 may generate a sequence of reads from the local memory followed by a sequence of writes to one or more backup memories. The backup memories for evacuating data may already be specified in advance, or alternatively, PCS 200 may determine which backup memories to write to based on the current status of the backup memories.

In a further embodiment, PCS 200 may provide a staging RAM capability where a replacement routine is loaded in memory 220 of PCS 200. Using a command from the host, the function pointer for a current routine can be switched over to the new routine's address to provide a seamless changeover. It should be noted that many different data layouts and types of memory error resilience schemes can be implemented by routines in PCS 200. PCS 200 may also be configured to execute other applications besides resilience, such as applications for controlling refresh, network routing status monitoring, and other applications.

Figure 3:
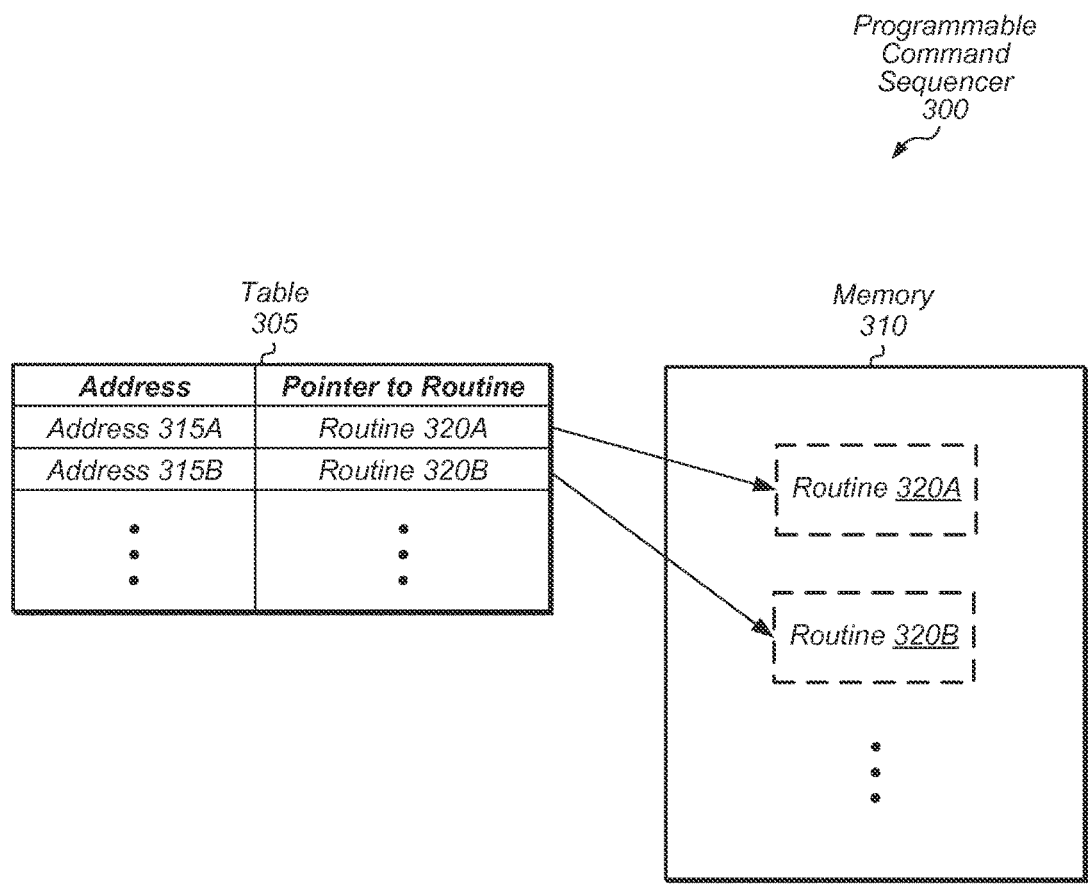
FIG. 3 is a block diagram of another embodiment of a PCS.

Referring now to FIG. 3, a block diagram of another embodiment of a programmable command sequencer (PCS) 300 is shown. PCS 300 may include at least table 305 and memory 310. Table 305 may be a lookup table, CAM, or other suitable structure, while memory 310 is representative of any number and type of memory devices. When a request is received by PCS 300, PCS 300 may decode the logical (or virtual) address of the request into a physical address and then perform a lookup of table 305 using the physical address. Alternatively, in another embodiment, the lookup of table 305 may be performed using the logical address of the request. The entries in table 305 may correspond to any size of physical address range, depending on the embodiment. For example, address 315A may correspond to a particular address range, and if the physical address of a request falls within that range, then the corresponding pointer in the entry may be utilized to access a routine 320A to execute for the request. Similarly, address 315B may point to routine 320B, and table 305 may include any number of other entries for other numbers of routines. It should be noted that multiple entries of table 305 may point to the same routine. Each routine 320A-B may include a plurality of instructions to be executed by PCS 300 in response to the routine being triggered by a received request.

For example, in one embodiment, routine 320A may be a first error correction routine for a first address range, routine 320B may be a second error correction routine for a second address range, and so on. It may be assumed for the purposes of this discussion that the first error correction routine has a first type of complexity while the second error correction routine has a second type of complexity, wherein the second type of complexity is different from the first type of complexity. Continuing with this example, routine 320A may utilize a redundant array of independent disks (RAID) scheme, and for each write request received by PCS 300, a plurality of memory write commands may be generated to stripe corresponding data and parity across multiple memory devices. For a read request, a plurality of memory read commands may be generated to read the data and parity spread across multiple memory devices. In another example, routine 320B may be a scrambling function routine which is utilized to store the data of a memory request in multiple random storage locations to prevent the data from being accessed by an unauthorized user. Routine 320B may be triggered by memory requests generated by an application with strict security requirements. In a further example, routine 320B may be a network routing routine which is utilized to manipulate data packet headers to route around faulty nodes, congestion, and/or failed memory devices. This routine 320B may be triggered in response to detecting network outages, congestion, or failures of nodes and/or memory devices. Other types of routines are possible and are contemplated.

Figure 4:
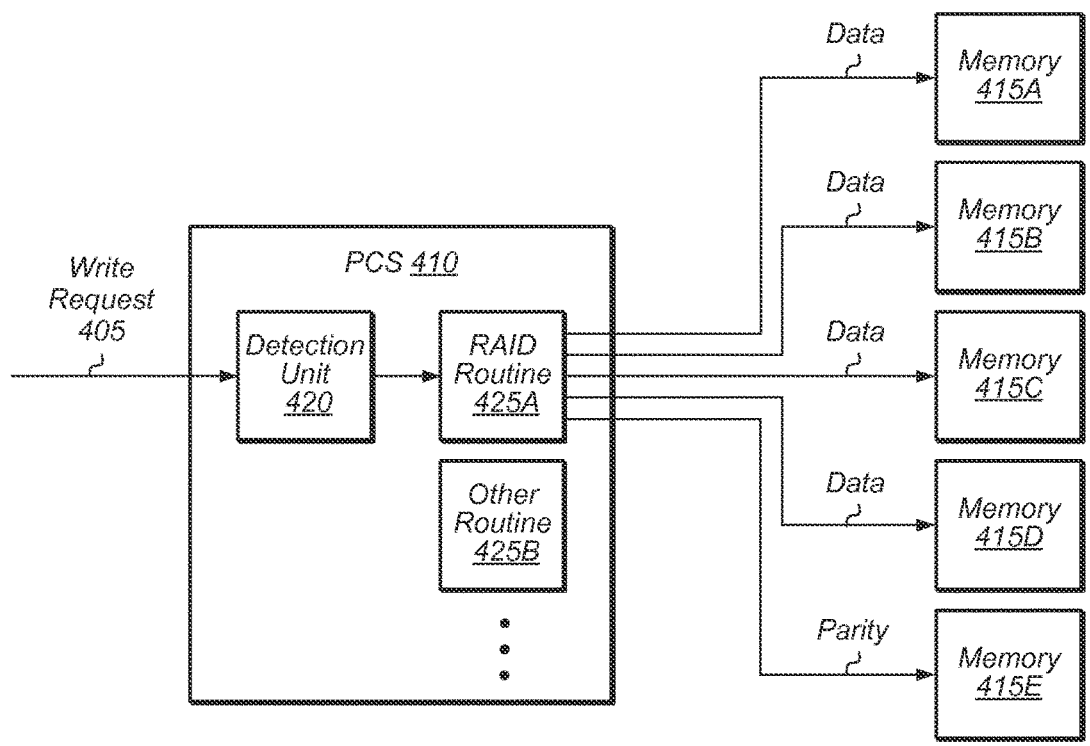
FIG. 4 is a block diagram of one embodiment of a PCS implementing a RAID scheme.

Turning now to FIG. 4, a block diagram of one embodiment of a PCS 410 implementing a RAID scheme is shown. In the example shown in FIG. 4, a single write memory request 405 is received and in response to the write memory request meeting one or more criteria (e.g., a specific address range), PCS 410 may generate a plurality of write memory commands and send these write memory commands to multiple memories 415A-E.

In one embodiment, the write request 405 may be received by detection unit 420 of PCS 410. Detection unit 420 may be implemented using any combination of software and/or hardware. In one embodiment, detection unit 420 may utilize a lookup table (e.g., table 305 of FIG. 3) to determine which routine to utilize for processing write request 405. In other embodiments, detection unit 420 may utilize other logic and/or techniques for determining which routine to trigger in response to receiving write request 405. In the illustrated embodiment, it may be assumed that detection unit 420 has triggered RAID routine 425A in response to receiving write request 405. RAID routine 425A may utilize a RAID level 5 scheme to stripe the data of write request 405 across four memories 415A-D and parity on memory 415E. It should be understood that RAID level 5 is merely one example of a RAID level which may be utilized by PCS 410. Other routine 425B is representative of any number of other routines which may be triggered by other memory requests meeting other criteria. PCS 410 may utilize any number of routines for responding to received memory requests, and these routines may be updated during runtime by a host processor. Other routines may also utilize other RAID levels, such that a first memory request triggers the generation of a sequence of memory commands using a first RAID level and a second memory request triggers the generation of a sequence of memory commands using a second RAID level, wherein the second RAID level is different from the first RAID level.

Figure 5:
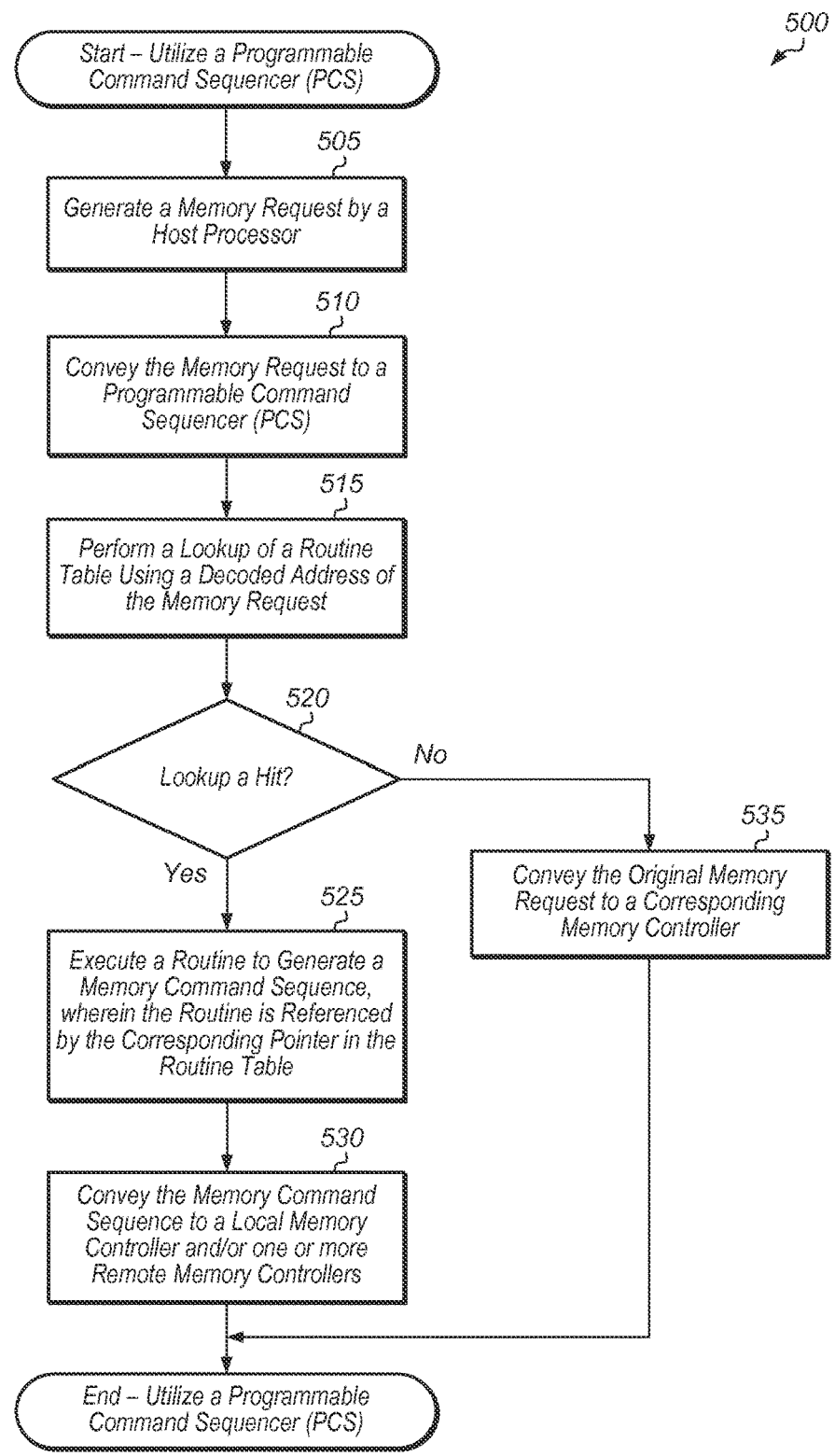
FIG. 5 is a generalized flow diagram illustrating one embodiment of a method for utilizing a programmable command sequencer (PCS).

Referring now to FIG. 5, one embodiment of a method 500 for utilizing a programmable command sequencer (PCS) is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various devices, apparatuses, or systems described herein may be configured to implement method 500.

A memory request may be generated by a host processor (block 505). The memory request may be conveyed to a programmable command sequencer (PCS) (block 510). The PCS may perform a lookup of a routine table using a decoded address of the memory request (block 515). Alternatively, the lookup may be performed using the logical address of the memory request. The routine table may be implemented as a lookup table, CAM, or other suitable structure. Next, the PCS may determine if the lookup is a hit (conditional block 520). If the lookup is a hit (conditional block 520, "yes" leg), then the PCS may execute a routine to generate a memory command sequence, wherein the routine is referenced by the corresponding pointer of the hit entry in the routine table (block 525). The PCS may then convey the memory command sequence to a local memory controller and/or one or more remote memory controllers (block 530). If the lookup is a miss (conditional block 520, "no" leg), then the PCS may convey the original memory request to a corresponding memory controller (block 535). After blocks 530 and 535, method 500 may end.

Figure 6:
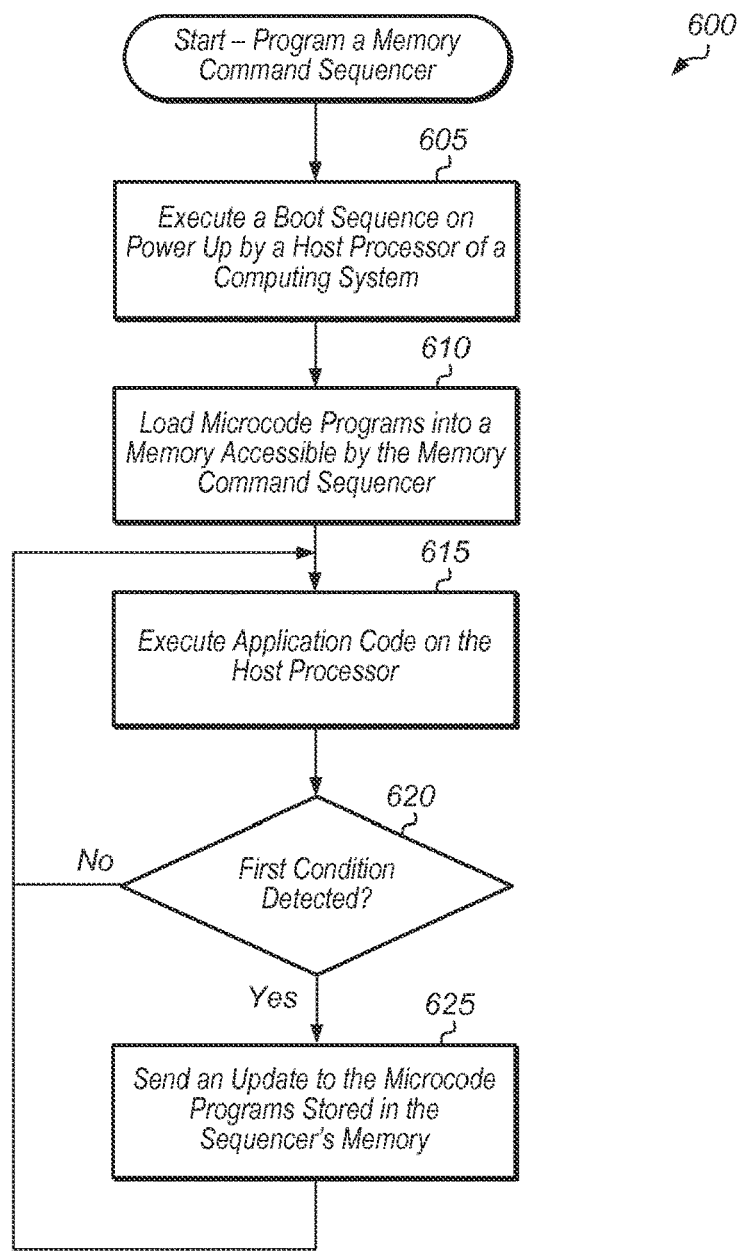
FIG. 6 is a generalized flow diagram illustrating another embodiment of a method for utilizing a programmable command sequencer (PCS).

Turning now to FIG. 6, one embodiment of a method 600 for programming a memory command sequencer is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various devices, apparatuses, or systems described herein may be configured to implement method 600.

A host processor of a computing system may execute a boot sequence on power up (block 605). As part of the boot sequence, the host processor may load microcode programs into a memory accessible by the memory command sequencer (block 610). The microcode programs may be stored in a local low-latency memory (e.g., SRAM), a region of the main memory, or another storage location. Then, the host processor may execute application code (block 615).

Next, the host processor may determine if a first condition has been detected (conditional block 620). In one embodiment, the first condition may be detecting a switch from executing a first application to executing a second application. In another embodiment, the first condition may be detecting an impending failure or loss of power. In other embodiments, the first condition may include detecting other events. If the first condition has been detected (conditional block 620, "yes" leg), then the host processor may send an update to the microcode programs stored in the sequencer's memory (block 625). In one embodiment, the host processor may send a new routine to the sequencer and notify the sequencer to use the new routine for a given memory request. In another embodiment, multiple routines may already be stored by the sequencer, and the host processor may command the sequencer to use a different routine for a given memory request (or for a given address range). If the first condition has not been detected (conditional block 620, "no" leg), then method 600 may return to block 615 with the host processor continuing to execute application code. After block 625, method 600 may also return to block 615.

Figure 7:
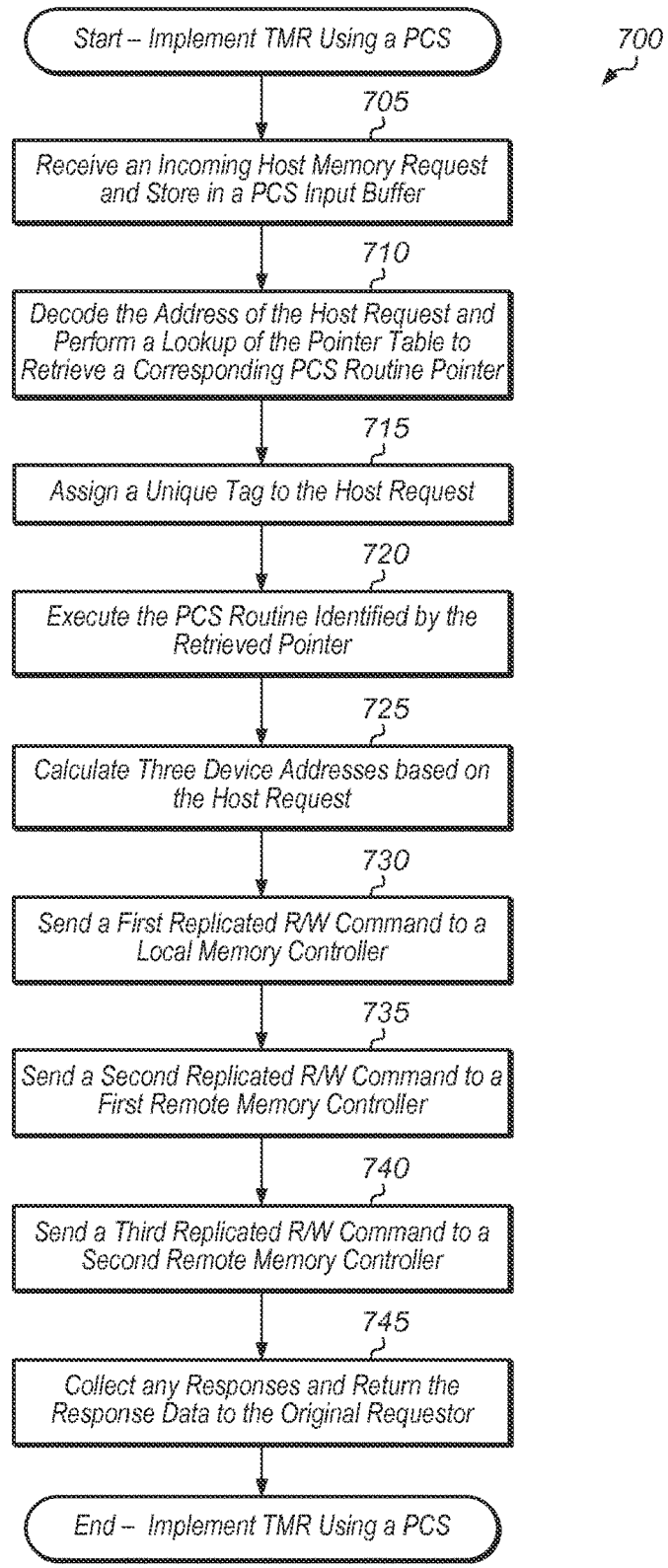
FIG. 7 is a generalized flow diagram illustrating one embodiment of a method for implementing triple-modular redundancy (TMR) using a programmable command sequencer (PCS).

Referring now to FIG. 7, one embodiment of a method 700 for implementing triple-modular redundancy (TMR) using a programmable command sequencer (PCS) is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various devices, apparatuses, or systems described herein may be configured to implement method 700.

An incoming host memory request may be received by a PCS and stored in a PCS input buffer (block 705). The PCS may decode the address of the host request and perform a lookup of a pointer table using the decoded address to retrieve a corresponding PCS routine pointer (block 710). Next, the PCS may assign a unique tag to the host request (block 715). Then, the PCS may execute the PCS routine identified by the retrieved pointer (block 720). It may be assumed for the purposes of this discussion that the identified routine is a TMR routine.

As part of the TMR routine, the PCS may calculate three device addresses based on the host request (block 725). Next, a first replicated read/write (R/W) command may be sent to the local memory controller (block 730). Also, a second replicated R/W command may be sent to a first remote memory controller (block 735). Additionally, a third replicated R/W command may be sent to a second remote memory controller (block 740). Next, the PCS may collect any responses (using tag match to identify sub-commands) and return the response data to the original requestor (block 745). After block 745, method 700 may end. It is noted that in other embodiments, other redundancy schemes targeting other numbers of devices may be utilized.

Figure 8:
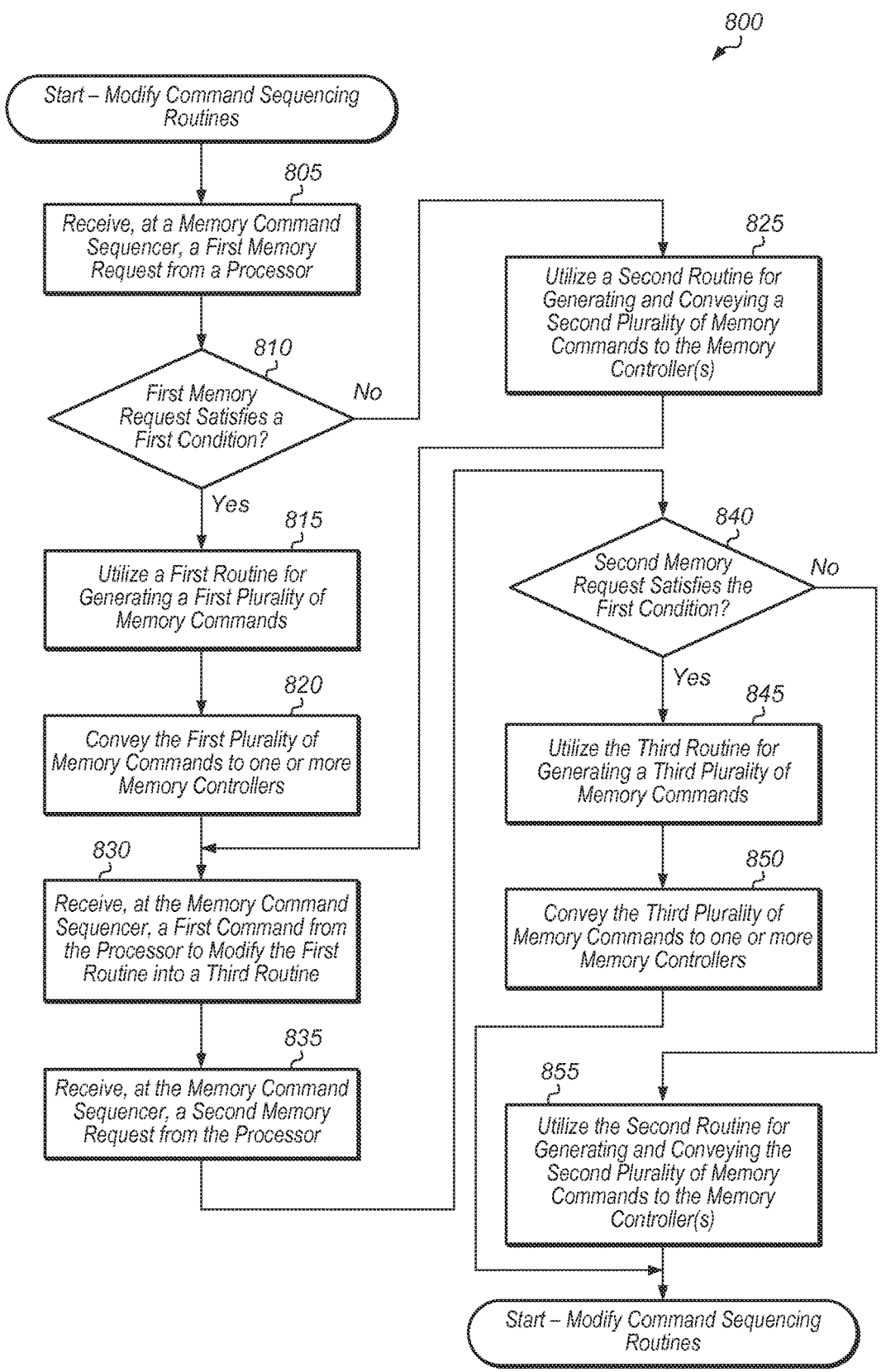
FIG. 8 is a generalized flow diagram illustrating another embodiment of a method for utilizing a programmable command sequencer (PCS).

Turning now to FIG. 8, one embodiment of a method 800 for modifying command sequencing routines is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various devices, apparatuses, or systems described herein may be configured to implement method 800.

A memory command sequencer may receive a first memory request from a host processor (block 805). Next, the memory command sequencer may determine if the first memory request satisfies a first condition (conditional block 810). In one embodiment, the first condition may comprise having a physical address within a first address range. In another embodiment, the first condition may comprise being associated with a first type of application. In a further embodiment, the first condition may be the first memory request having a specific priority. In other embodiments, the first condition may comprise other factors.

If the first memory request satisfies the first condition (conditional block 810, "yes" leg), then the memory command sequencer may utilize a first routine for generating a first plurality of memory commands (block 815). In one embodiment, the first plurality of memory commands may include a first level of error correction. Next, the memory command sequencer may convey the first plurality of memory commands to one or more memory controllers (block 820). The one or more memory controllers may include local and/or remote memory controllers. In some embodiment, the one or more memory controllers may utilize a second level of error correction in addition to the first level of error correction utilized by the memory command sequencer. If the first memory request does not satisfy the first condition (conditional block 810, "no" leg), then the memory command sequencer may utilize a second routine for generating and conveying a second plurality of memory commands to the memory controller(s) (block 825). It may be assumed for the purposes of this discussion that the second plurality of memory commands is different from the first routine. Alternatively, the memory command sequencer may convey the original first memory request to the memory controller without generating memory commands in block 825. In a further embodiment, the memory command sequencer may check if the first memory request satisfies more than one condition, and the memory command sequencer may be configured to execute any of a plurality of different routines in response to determining the first memory request satisfies any of a plurality of different conditions.

After blocks 820 and 825, the memory command sequencer may receive a first command from the host processor to modify the first routine to create a third routine (block 830). In one embodiment, the host processor may overwrite the first routine with the third routine. In another embodiment, the host processor may store the third routine separately from the first routine in the memory of the memory command sequencer. Next, the memory command sequencer may receive a second memory request from the host processor (block 835). Then, the memory command sequencer may determine if the second memory request satisfies the first condition (conditional block 840). If the second memory request satisfies the first condition (conditional block 840, "yes" leg), then the memory command sequencer may utilize the third routine for generating a third plurality of memory commands (block 845). It may be assumed for the purposes of this discussion that the third plurality of memory commands are different from the first plurality of memory commands. In some cases, the third plurality of memory commands may target different local and/or remote memory controllers than the memory controllers targeted by the first plurality of memory commands. Next, the memory command sequencer may convey the third plurality of memory commands to the one or more memory controllers (block 850). If the second memory request does not satisfy the first condition (conditional block 840, "no" leg), then the memory command sequencer may utilize the second routine for generating and conveying the second plurality of memory commands to the memory controller(s) (block 855). After blocks 850 and 855, method 800 may end.

In various embodiments, program instructions of a software application may be used to implement the methods and/or mechanisms previously described. The program instructions may describe the behavior of hardware in a high-level programming language, such as C. Alternatively, a hardware design language (HDL) may be used, such as Verilog. The program instructions may be stored on a non-transitory computer readable storage medium. Numerous types of storage media are available. The storage medium may be accessible by a computing system during use to provide the program instructions and accompanying data to the computing system for program execution. The computing system may include at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A method comprising:
   receiving, at a memory command sequencer, a first memory request from a processor;
   performing, by the memory command sequencer, a lookup of a table based on an address included in the received first memory request;
   responsive to determining that the lookup is a miss in the table, the memory command sequencer conveying the first memory request to a first memory controller;
   responsive to determining that the lookup is a hit on a given entry in the table:
      identifying a first routine comprising one or more executable instructions that corresponds to the hit;
      executing, by the memory command sequencer, the first routine to generate one or more new memory requests; and
      conveying the one or more new memory requests to the first memory controller.

2. The method as recited in claim 1, wherein the table comprises a plurality of entries, each of the entries including an address and a pointer to a location in a memory storing instructions configured to generate one or more memory requests when executed.

3. The method as recited in claim 1, further comprising:
   modifying, by the processor, the first routine to create a second routine comprising one or more executable instructions different from the first routine;
   receiving, at a memory command sequencer, a second memory request from the processor;
   performing, by the memory command sequencer, a lookup of the table based on an address included in the received second memory request;
   responsive to determining that the second memory request is a hit on the given entry in the table:
      executing the second routine to generate one or more memory requests different from the new memory requests; and
      conveying the one or more memory requests different from the new memory requests to the first memory controller.

4. The method as recited in claim 2, wherein responsive to determining the lookup is a hit, execution of the first routine further comprises:
   conveying one or more memory requests via a network router to a first remote memory controller; and conveying one or more memory requests via the network router to a second remote memory controller different from the first remote memory controller.

5. The method as recited in claim 4, further comprising collecting responses from a local memory, the first remote memory controller, and the second remote memory controller, and returning the responses to the processor.

6. The method as recited in claim 3, wherein the first routine utilizes a first type of error correction and the second routine utilizes a second type of error correction that is different from the first type of error correction.

7. The method as recited in claim 1, wherein the memory command sequencer comprises a processor or microcontroller configured to execute the first routine.

8. A system comprising:
a processor configured to convey a first memory request; and
a first memory comprising a memory command sequencer, wherein the memory command sequencer is configured to:
receive the first memory request;
perform a lookup of a table based on an address included in the received first memory request;
responsive to determining that the lookup is a miss in the table, convey the first memory request to a first memory controller;
responsive to determining that the lookup is a hit on a given entry in the table:
identify a first routine comprising one or more executable instructions that corresponds to the hit;
execute the first routine to generate one or more new first memory requests; and
convey the one or more new memory requests to the first memory controller.

9. The system as recited in claim 8, wherein the table comprises a plurality of entries, each of the entries including an address and a pointer to a location in a memory storing instructions configured to generate one or more memory requests when executed.

10. The system as recited in claim 8, further comprising:
the processor modifying the first routine to create a second routine comprising one or more executable instructions different from the first routine;
the memory command sequencer receiving a second memory request from the processor;
the memory command sequencer performing a lookup of the table based on an address included in the received second memory request;
responsive to determining that the second memory request is a hit on the given entry in the table, the memory command sequencer is configured to:
execute the second routine to generate one or more memory requests different from the new memory requests; and
convey the one or more memory requests different from the new memory requests to the first memory controller.

11. The system as recited in claim 8, wherein responsive to determining the lookup is a hit, execution of the first routine comprises:
conveying one or more memory requests via a network router to a first remote memory controller; and
conveying one or more memory requests via the network router to a second remote memory controller different from the first remote memory controller.

12. The system as recited in claim 11, wherein the first memory controller is configured to collect responses from the first memory, the first remote memory, and the second remote memory, and return the responses to the processor.

13. The system as recited in claim 8, the memory command sequencer comprises a processor or microcontroller configured to execute the first routine.

14. The system as recited in claim 12, wherein the memory command sequencer is configured to assign a tag that identifies the first memory request to each of the one or more new memory requests, the one or more memory requests conveyed to the first remote memory controller, and the one or more memory requests sent to the second remote memory controller.

15. A non-transitory computer readable storage medium storing program instructions, wherein the program instructions are executable by a processor to:
receive, at a memory command sequencer, a first memory request from a processor;
perform, by the memory command sequencer, a lookup of a table based on an address included in the received first memory request;
responsive to determining that the lookup is a miss in the table, cause the memory command sequencer to convey the first memory request to a first memory controller;
responsive to determining that the lookup is a hit on a given entry in the table:
identify a first routine comprising one or more executable instructions that corresponds to the hit;
execute, by the memory command sequencer the first routine to generate one or more new memory requests; and
convey the one or more new memory requests to the first memory controller.

16. The non-transitory computer readable storage medium as recited in claim 15, wherein the table comprises a plurality of entries, each of the entries including an address and a pointer to a location in a memory storing instructions configured to generate one or more memory requests when executed.

17. The non-transitory computer readable storage medium as recited in claim 15, wherein the program instructions are executable to cause:
the processor to modify the first routine to create a second routine comprising one or more executable instructions different from the first routine;
the memory command sequencer to receive a second memory request from the processor;
the memory command sequencer to perform a lookup of the table based on an address included in the received second memory request; and
responsive to determining that the second memory request is a hit on the given entry in the table, cause the memory command sequencer to:
execute the second routine to generate one or more memory requests different from the new memory requests; and
convey the one or more memory requests different from the new memory requests to the first memory controller.

18. The non-transitory computer readable storage medium as recited in claim 17, wherein responsive to determining the lookup is a hit, execution of the first routine comprises:
conveying one or more memory requests via a network router to a first remote memory controller; and
conveying one or more memory requests via the network router to a second remote memory controller different from the first remote memory controller.

19. The non-transitory computer readable storage medium as recited in claim 18, wherein the program instructions are further executable to cause the memory command sequencer to assign a tag that identifies the first memory request to each of the one or more new memory requests, the one or more memory requests conveyed to the first remote memory controller, and the one or more memory requests sent to the second remote memory controller.

20. The non-transitory computer readable storage medium as recited in claim 15, wherein the program instructions include instructions executable by a processor or microcontroller in the memory command sequencer.

\* \* \* \* \*